United States Patent
Dunko et al.

(10) Patent No.: US 7,983,614 B2
(45) Date of Patent: Jul. 19, 2011

(54) HANDOVER FOR AUDIO AND VIDEO PLAYBACK DEVICES

(75) Inventors: Gregory A. Dunko, Cary, NC (US); Daniel P. Homiller, Cary, NC (US); Nadi Sakir Findikli, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1328 days.

(21) Appl. No.: 11/537,147

(22) Filed: Sep. 29, 2006

(65) Prior Publication Data

US 2008/0081558 A1 Apr. 3, 2008

(51) Int. Cl.
*H04B 5/00* (2006.01)
(52) U.S. Cl. .... 455/41.1; 455/41.2; 455/420; 455/556.1
(58) Field of Classification Search ............... 455/41.1, 455/41.2, 74, 418, 419, 420, 424, 426.1, 455/436, 439, 556.1, 41.3
See application file for complete search history.

(56) References Cited

U.S. PATENT DOCUMENTS

| | | | |
|---|---|---|---|
| 6,871,063 B1 * | 3/2005 | Schiffer | 455/410 |
| 2004/0198436 A1 | 10/2004 | Alden | |
| 2005/0166135 A1 * | 7/2005 | Burke et al. | 715/500.1 |
| 2006/0095848 A1 * | 5/2006 | Naik | 715/716 |
| 2006/0233519 A1 * | 10/2006 | Narita | 386/95 |
| 2006/0270395 A1 * | 11/2006 | Dhawan et al. | 455/418 |

FOREIGN PATENT DOCUMENTS

JP 2002076977 A 3/2002

OTHER PUBLICATIONS

International Search Report, International Application No. PCT/US2007/065587, Date of Mailing: Apr. 2, 2008.

* cited by examiner

*Primary Examiner* — Tuan H Nguyen
(74) *Attorney, Agent, or Firm* — Coats & Bennett, P.L.L.C.

(57) ABSTRACT

Playback of a media work is handed over from a source playback device to a target playback device while the source playback device is in a play mode. The target playback device continues playback of the media work at a current location in the media work being played. Handover of audio and video playback allows the user to enjoy continuity in playback of the media work when transitioning between playback devices.

26 Claims, 7 Drawing Sheets

HANDOVER FOR AUDIO AND VIDEO PLAYBACK DEVICES

BACKGROUND

The present invention relates generally to playback devices for playing audio and/or video content, and, more particularly, to a method for handover of audio and/or video playback from a source playback device to a target playback device.

A common problem with conventional playback devices is that such devices do not interoperate. For example, a user listening to a portable radio may want to continue listening to the same radio station on a car or home stereo system when entering a car or home. Because the portable radio and car or home stereo system do not interoperate, the user must manually turn on and/or tune the car or home stereo system to continue listening to the same station. A similarly-frustrating situation occurs when a user is listening to pre-recorded music on a portable audio player. Even if the same music library is available to the car or home stereo system, the user must nevertheless search for the current song or playlist and initiate playback on the car or home stereo system. In this case, it would be difficult for the user to continue playback of the current song at the same location in the song.

SUMMARY OF THE INVENTION

The present invention provides a method for transferring playback of audio and/or video works from a source playback device to a target playback device. In an exemplary embodiment, the playback devices are equipped with a near-field communication (NFC) interface that enables data transfer when the source playback devices are placed in close proximity. When the source playback device is in a play mode and detects a compatible target playback device, the source playback device transfers playback information to the target playback device. The playback information allows the target playback device to continue playback without substantial interruption. Thus, playback devices according to the present invention can handover playback from one device to another to provide more continuity in the user's media experience.

In another aspect of the invention, the playback information may include digital rights management (DRM) information. When the work being played back is subject to DRM, keys or other information needed to play the work may be transferred to the target playback device. In this manner, permission to access a particular work may be transferred from one device to another subject to any applicable DRM rules.

In another aspect of the invention, the playback information may include current playback settings, such as volume levels and equalizer settings. Special effects, such as ramping and/or fading, can be applied when transitioning from the source playback device to the target playback device.

DETAILED DESCRIPTION OF THE DRAWINGS

Figure 1:
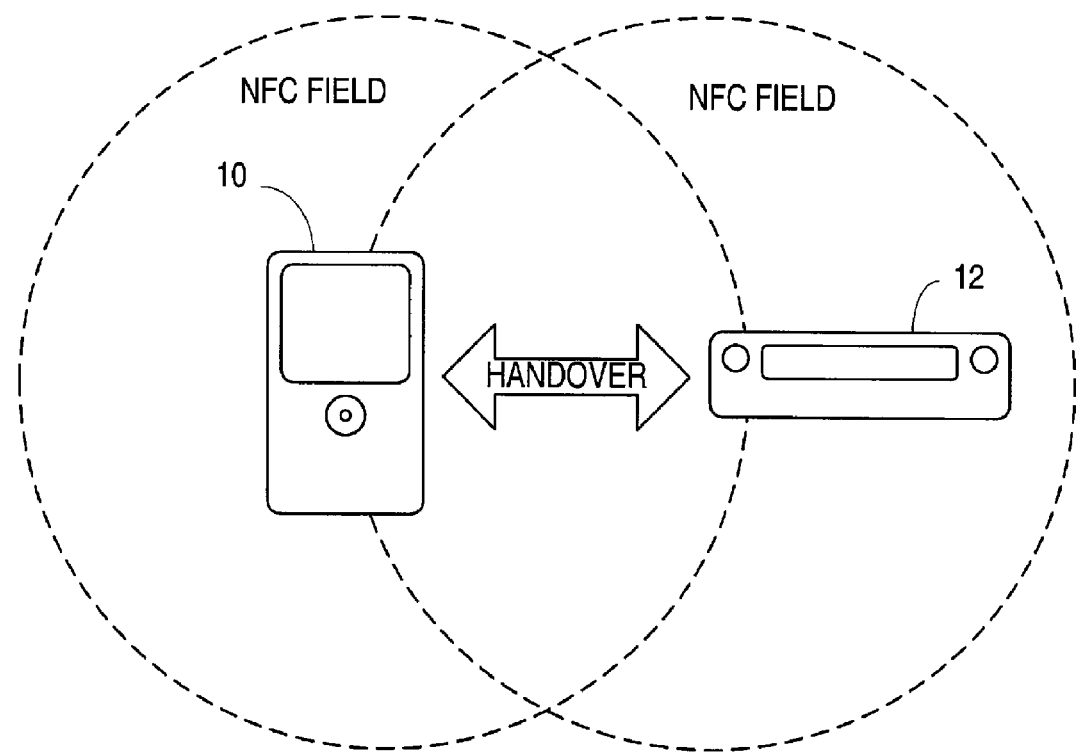
FIG. 1 illustrates source and target playback devices.

Referring now to the drawings, exemplary embodiments of the present invention are described. Throughout the various embodiments, similar numbers have been used to indicate similar parts. The drawings and following description are intended to explain the underlying concepts and principles of the present invention, which may be applied by those skilled in the art to other embodiments. Therefore, the drawings and descriptions should not be construed as limiting the invention.

Referring now to FIG. 1, the present invention involves a method for handing over playback of audio and video works from a source playback device 10 to a target playback device 12. The term "playback device" refers to any device capable of playing audio and/or video works including without limitation digital audio players, digital video players, home and car stereo systems, portable radios, portable televisions, communication devices 10 with audio and/or video playback capabilities, and computing devices 10 with audio and video playback capabilities.

A common problem with conventional playback devices is that such devices do not interoperate. As one example, consider a consumer listening to music on a portable audio player. When the user comes into proximity of a fixed stereo system in the user's home or car, the user may desire to handover playback of the music to the home or car stereo system. Conversely, the same person may want to handover playback from a home or car stereo system to a portable audio player when leaving the user's home or exiting a car. The present invention solves this problem by providing a handover mechanism to handover playback of audio and video works from a source playback device 10 to a target playback device 12.

As will be described in more detail below, the present invention utilizes near-field communication (NFC) technology to transfer playback information from a source playback device 10 to the target playback device 10. The playback information enables the second playback device 10 to continue playback of audio and video works to provide greater continuity in the user's media experience.

Figure 2:
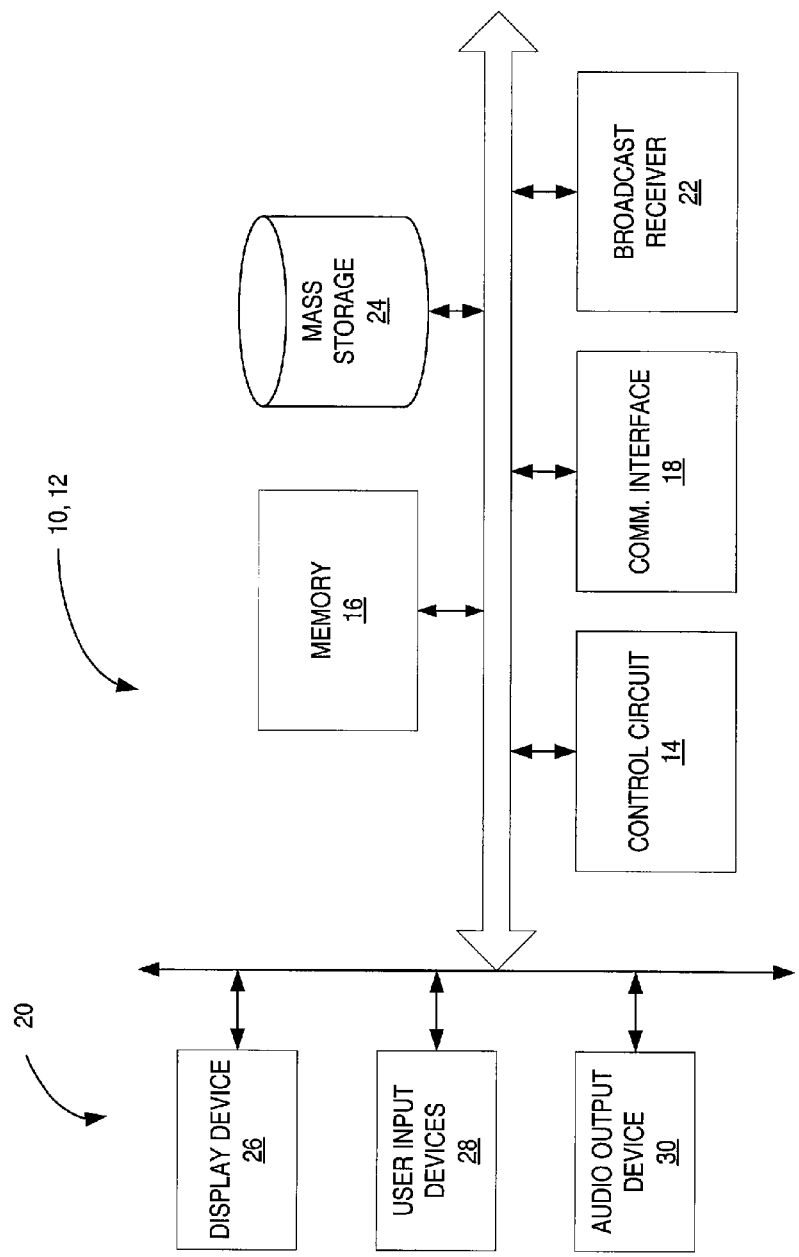
FIG. 2 illustrates the main components of an exemplary playback device.

FIG. 2 illustrates an exemplary playback device 10, 12 according to one embodiment of the present invention. The playback device 10, 12 comprises a control circuit 14 to control operation of the playback device 10, memory 16 to store programs and data required for operation, a communication interface 18 to communicate with other playback devices 10, 12, and a user interface 20 to enable user control of, and interaction with, the playback device 10. 12. In some embodiments, the playback device 10, 12 may further include a broadcast receiver 22, such as an FM receiver, television receiver, or satellite receiver, to receive broadcast signals, and/or a mass storage device 24 for storing audio and video works.

The control circuit 14 may comprise one or more processors, hardware, firmware, or a combination thereof, to carry out the functions of the playback device 10, 12. For example, the control circuit 14 may include a main processor to control overall operations of the playback device and a separate digital signal processor to process audio and/or video signals. The main processor may comprise a general purpose programmable processor executing an embedded operating system and application programs stored in memory 16. The digital signal processor may comprise a specialized processor for performing video and/or audio processing, such as compression/decompression of audio and video signals.

Memory 16 may comprise one or more static and/or dynamic memory devices to store programs and data needed for operation. Static memory devices may include, for example, programmable read-only memory (PROM), erasable PROM (EPROM), electrically erasable PROM (EEPROM), and flash memory. Dynamic memory devices may include, for example, random access memory (RAM).

The communication interface 18 preferably comprises a short-range wireless interface that enables the transfer of data between playback devices 10, 12. In one embodiment, the communications interface comprises a near-field communication (NFC) interface. NFC is a short-range wireless technology developed for contactless communications. A typical NFC device generates a low frequency radio wave field in the 13.56 MHz spectrum. When NFC devices are placed in close proximity, data is transferred between the NFC devices through magnetic inductive coupling. The process of placing NFC devices in close proximity to enable data transfer is referred to as "touching" or "swiping." "Touching" NFC devices is similar to swiping a credit card in a card reader.

An NFC device can be active or passive. An active NFC device has its own power supply. In contrast, a passive NFC device has no internal power supply and absorbs energy from an active device when it is in close proximity. Once powered, the passive device can communicate and exchange data with the active NFC device.

The communication interface 18 may further include, in addition to the NFC interface, a short-range radio interface for communicating with other devices, such as a Bluetooth interface, Zigbee interface, or Wi-Fi interface.

The user interface 20 comprises a display device 26, one or more user input devices 28, and an audio output device 30. The display device 26, also referred to herein as display 26, may comprise an electronic display, such as a liquid crystal display (LCD), capable of displaying video images. The operating system may use the display device 26 to provide a graphical user interface. The display device 26 may also be used to render or play a video work or the video portion of audiovisual works. The user input devices 28 allow the user to input data and control operation of the playback device 10, 12. The playback device 10, 12 may use any conventional user input devices 18, such as keypads, touchpads, scroll wheels, and push buttons. If the display device 28 comprises a touch-sensitive display, the display device 26 could also be used as a user input device 28. The audio output device 30 comprises a transducer, such as a speaker, for converting audio signals into audible signals that can be heard by the user. The audio output device 30 is used to play audio works, such as pre-recorded, broadcast or streaming audio, or the audio portion of audiovisual works.

If present, the broadcast receiver 22 enables the playback device 10, 12 to receive and play broadcast signals, such as radio signals and television signals. The mass storage device allows audio and/or video works to be stored in the playback device 10, 12. The mass storage device 24 may be an internal or external storage device. The mass storage device 24 may also be a removable storage device, such as a memory card or flash disk. An advantage of using a removable memory device is that such devices can be transferred from one device to another.

The playback device 10, 12 can be integrated with or incorporated into other devices, such a mobile communication device. As one example, the playback device 10, 12 may comprise a cellular telephone or personal digital assistant device with a fully functional cellular transceiver (not shown). The playback device 10, 12 could also comprise a computing device, such as a laptop computer with a wireless interface according to the IEEE 802.11 family of standards.

Figure 3:
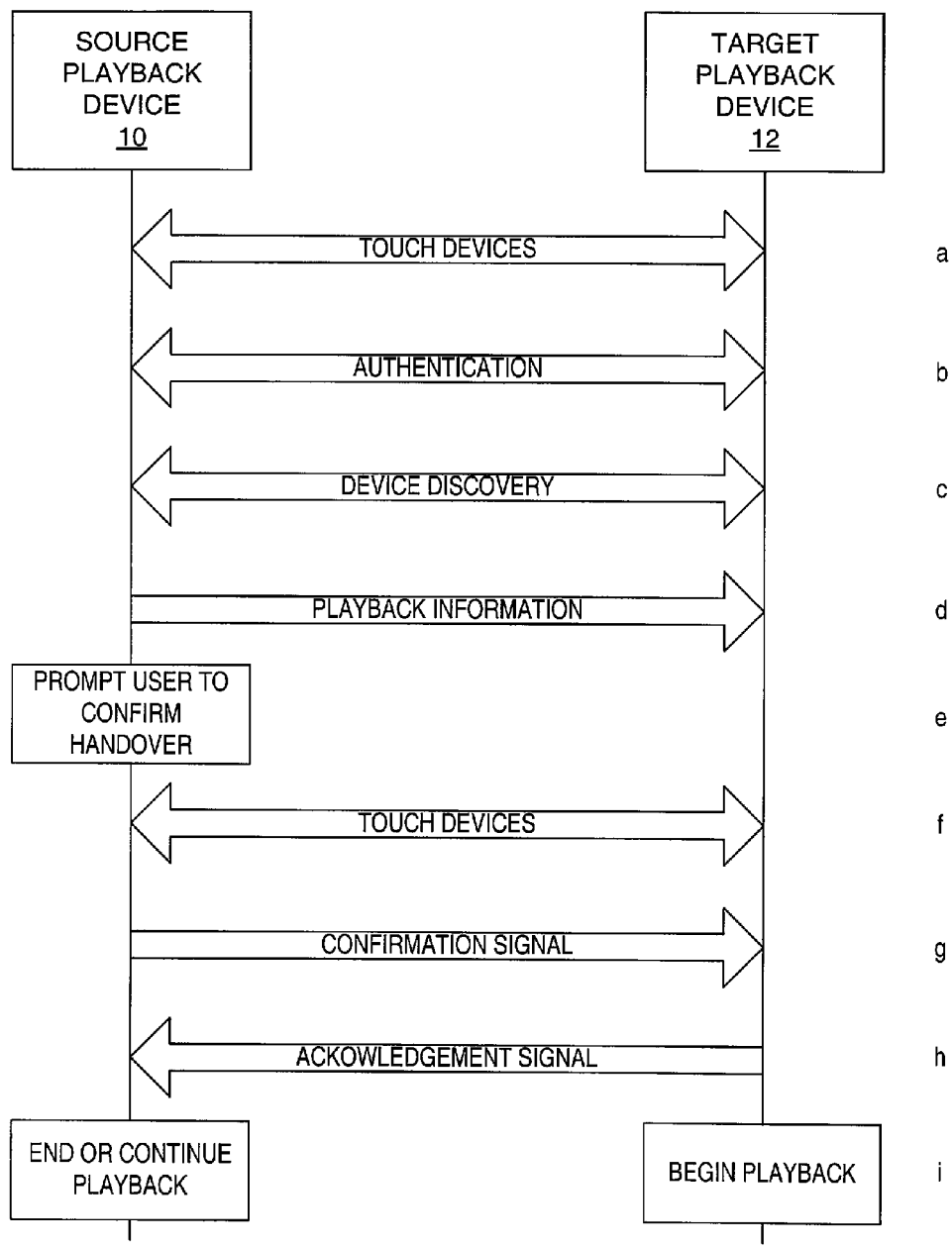
FIG. 3 illustrates an exemplary multi-touch handover procedure for transferring playback from a portable playback device to a fixed playback device.

FIG. 3 illustrates an exemplary "multi-touch" procedure for handing over playback of an audio or video work according to one exemplary embodiment. FIG. 3 illustrates the handover of music playback from a portable playback device (the source playback device 10) to a fixed playback device, such as a car or home stereo (the target playback device 12). It is assumed that the source and target playback devices 10, 12 have access to the same content. In the case of pre-recorded music, this can be achieved by storing the same music library in both playback devices 10, 12. Those skilled in the art will appreciate that the order of the steps in the exemplary procedure is not critical and could be changed.

Figure 4:
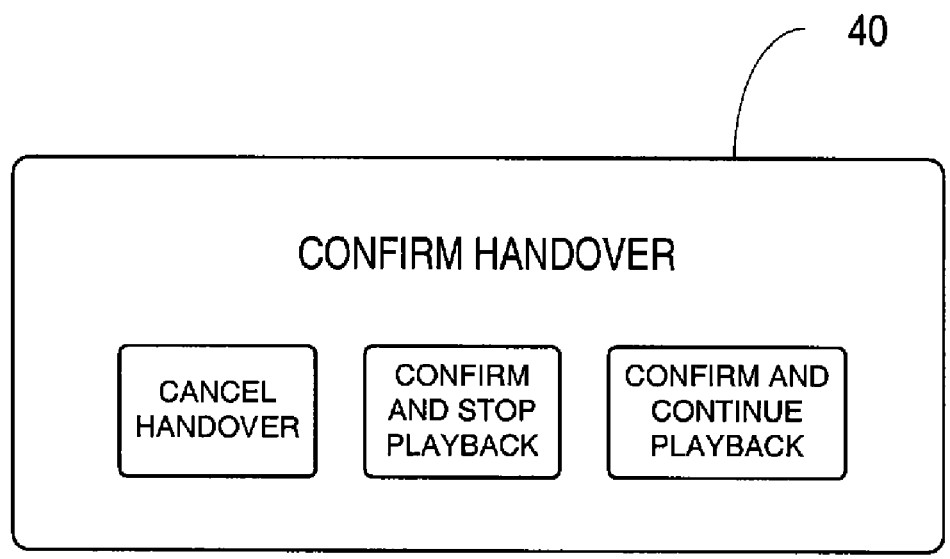
FIG. 4 illustrates an exemplary user dialogue to confirm a handover.

In this example, transfer of playback is initiated by "touching" the target playback device 12 with the source playback device 10 (step a). Each of the playback devices 10, 12 detects the presence of the other playback device 10, 12. Initially, the playback devices 10, 12 perform an authentication procedure and exchange device information, such as their respective capabilities (steps b and c). The exchange of device information is referred to herein as device discovery. If the source playback device 10 is in a playback mode, that is, it is currently playing a work, it transfers playback information to the target playback device 12 (step d). After authentication and exchange of device information, the source playback device 10 prompts the user to cancel or confirm the handover (step e). The user dialog 40 shown in FIG. 4 prompts the user to cancel the handover, to confirm the handover and stop playback on the source playback device 10, or to confirm the handover and continue playback on the source playback device 10. If a prompt is used, the user will have to "touch" or "swipe" the source and target playback devices 10, 12 a second time in order to confirm the handover (step f). When the source and target playback devices 10, 12 are "touched" the second time, a confirmation signal is transferred to the target playback device 12 (step g). The target playback device 12 will then begin playback and send an acknowledgement signal to the source playback device 10 (steps h and i). In response to the acknowledgement signal, the source playback device 10 may end or continue playback (step j).

The above procedure could be varied in a number of ways. For example, the confirmation and acknowledgement signals could, alternatively, be sent in via an alternate communications interface, such as a BLUETOOTH OR Wi-Fi interface. Using an alternate interface for sending the confirmation and acknowledgement signals does not require further user action (no second touching) and could be done transparently from the user's perspective. Configuration information relating to the alternate interface could be transferred during the first touching of the source and target playback devices 10, 12. In some embodiments, the user of the source playback device 10 may be prompted a second time to either continue or stop playback from the source playback device 10. However, a single prompt can be used to both confirm the handover and to indicate whether to continue playback on the source device as shown in FIG. 3.

Some users may find prompts to be annoying or tiresome. Such users will typically prefer to handover playback from a source playback device 10 to a target playback device 12 with a single touch. Therefore, a preferred embodiment provides the user with the option of turning off prompts, which may be controlled by user preference settings in software that can be selectively enabled and disabled by the user. If prompts are turned off, a confirmation signal can be sent to the target playback device 12 along with the playback information so that the target playback device 12 will begin playback immediately. The user may also choose a default setting to indicate whether playback should be stopped or continued on the source playback device 10 after the handover. In this case, the user can transfer playback to the target playback device 12 in a single swipe by simply "touching" the source and target playback devices 10, 12.

Figure 5:
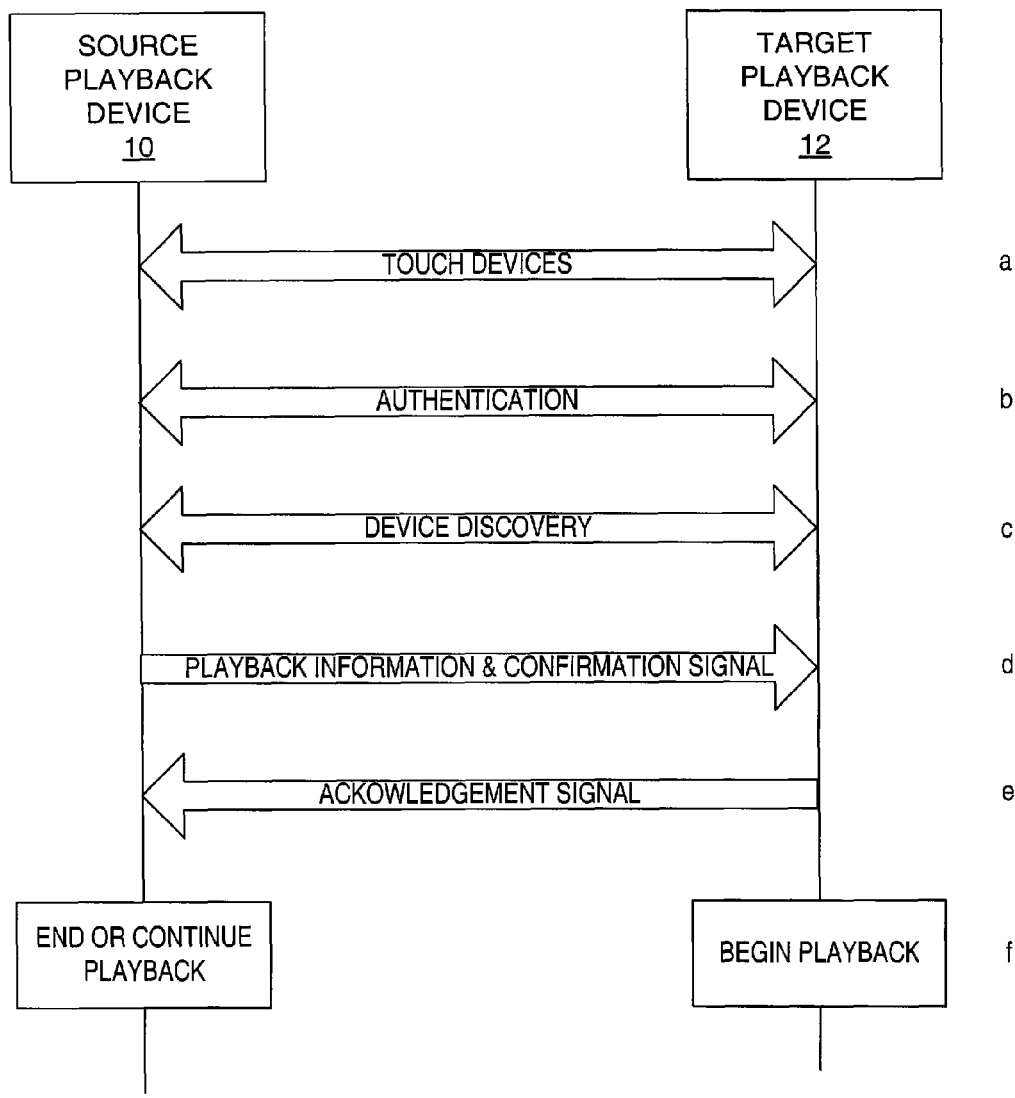
FIG. 5 illustrates an exemplary single-touch handover procedure for transferring playback from a portable playback device to a fixed playback device.

FIG. 5 illustrates a "single touch" handover procedure used when prompts are turned off. The user initiates the handover by "touching" the source and target playback devices 10, 12 (step a). The source and target playback devices 10, 12 perform an authentication procedure and exchange device information about their respective capabilities as previously described (steps b and c). If the source playback device 10 is in a playback mode, it transfers playback information to the target playback device 10 (step d). At the same time, the source playback device 10 sends a confirmation signal to the target playback device 12. The target playback device 12 begins playback and sends an acknowledgment signal (steps e and f). In response to the acknowledgment signal, the source playback device 10 either stops playback or continues playback based on the user preference settings (step f).

The content of the playback information transferred will depend on the type of work that is being played. For example, if the user is listening to a broadcast radio program, the playback information will include a station identifier. As a further example, if the user is listening to a pre-recorded audio work stored in memory, the playback information may include a song identifier and a location index that marks the current location in the audio work being played. The location index enables the target playback device 12 to continue playback from the same location in a song or other work after the handover is complete. The playback information may also include a playlist identifier if the song or work is part of a playlist. If the user is playing songs from a particular playlist, the playlist identifier allows the target playback device 12 to continue playing songs from the same playlist.

If the work is subject to a digital rights management (DRM) or copy protection scheme, the playback information may also include DRM information. Playback information can also include current playback settings, such as volume and equalizer settings.

Figure 6:
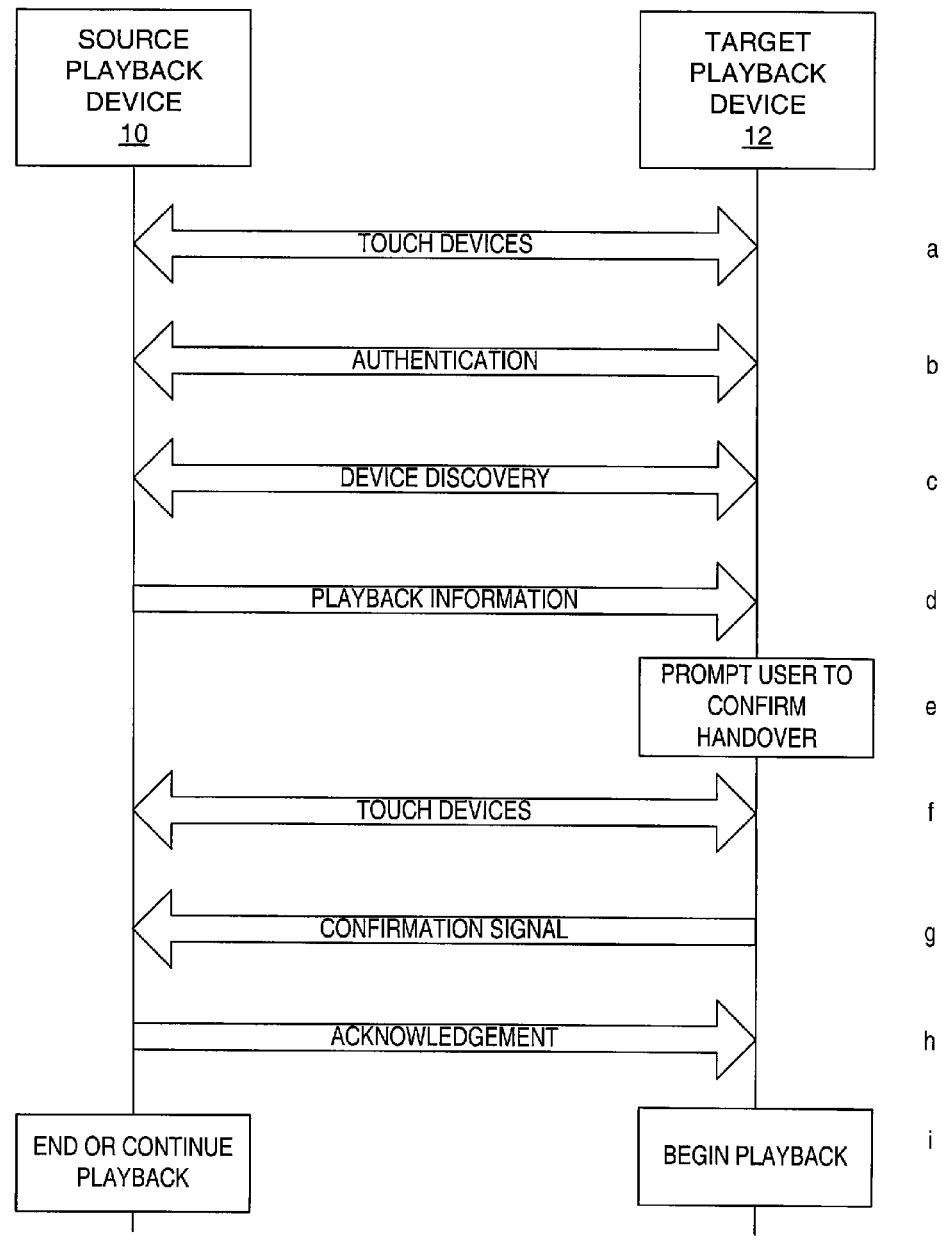
FIG. 6 illustrates an exemplary multi-touch handover procedure for transferring playback from a fixed playback device to a portable playback device.

FIG. 6 illustrates another exemplary multi-touch handover procedure where the portable playback device is the target and a car or home stereo system is the source. The user initiates the handover by "touching" the source and target playback devices 10, 12 (step a). The source and target playback devices 10, 12 perform an authentication procedure and exchange device information as previously described (steps b and c). If the source playback device 10 is in a playback mode, it transfers playback information to the target playback device 10 (step d). The target playback device 12 (which in this example is the portable playback device) may then prompt the user to confirm the handover (step e). The prompt shown in FIG. 4 allows the user to cancel the handover, to confirm the handover and stop playback on the source device 10, or to confirm the handover and continue playback on the source playback device 10. If the user selects the first option, the handover is canceled. If the user selects the second or third options, the user "touches" the source playback device 10 with the target playback device 12 a second time (step f). The target playback device 10 sends a confirmation signal to the source playback device to confirm the handover and starts playback of the work (steps g and i). The source playback device 10 acknowledges the confirmation signal (step h) and either stops playback in response to the confirmation signal or continues playback depending on the user's selection (step i).

Figure 7:
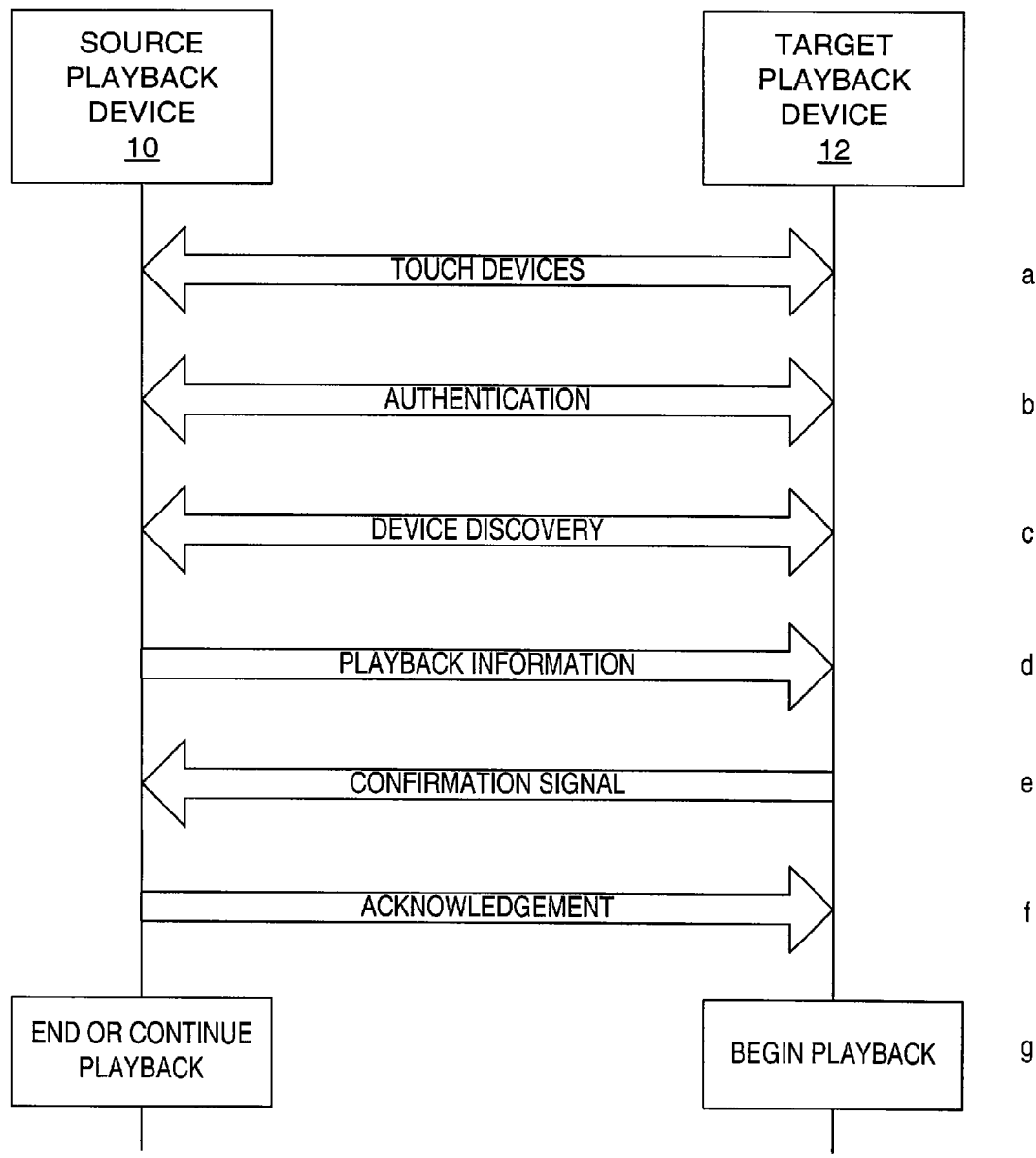
FIG. 7 illustrates an exemplary single-touch handover procedure for transferring playback from a fixed playback device to a portable playback device.

FIG. 7 illustrates an exemplary single-touch handover procedure where the portable playback device is the target and a car or home stereo is the source. In this example, the user can select a default user preference setting that indicates whether to stop or continue playback on the source playback device 10 following a handover. The user initiates the handover by "touching" the source playback device 10 with the target playback device 12 (step a). The source and target playback devices 10, 12 perform an authentication procedure and exchange device information about their respective capabilities as previously described (steps b and c). If the source playback device 10 is in a playback mode, it transfers playback information to the target playback device 10 (step d). Upon receipt of the playback information, the target playback device 12 sends a confirmation signal to the source playback device 10 and starts playback of the work (steps e and g). The source playback device 10 acknowledges the confirmation signal (step g) either stops playback in response to the confirmation signal or continues playback depending on the default user preference setting selected by the user (step f).

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A handover method for transferring playback of a media work from a source playback device to a target playback device, said method comprising:
   detecting a source playback device in range for data transfer to a target play back device;
   receiving, responsive to the detection of the source playback device, playback information at said target playback device from said source playback device for a media work currently being played by said source playback device;
   using the playback information to continue playback of the same media work by the target playback device.

2. The playback method of claim 1 wherein the media work comprises a broadcast program and wherein the playback information comprises channel information.

3. The method of claim 2 wherein the media work comprises a media stream and wherein the playback information comprises a stream identifier for the media stream.

4. The method of claim 3 wherein the playback information further includes a starting location in the media stream at which the target device begins playback.

5. The method of claim 1 wherein the media work comprises a pre-recorded media work stored in memory and wherein the playback information comprises an identifier for the pre-recorded media work.

6. The method of claim 5 wherein the playback information further includes a starting location in the pre-recorded media at which the target device begins playback.

7. The method of claim 1 wherein the playback information further comprises digital rights management information.

8. The method of claim 1 wherein the playback information further comprises at least one playback setting.

9. The method of claim 8 wherein the playback setting comprises a volume level.

10. The method of claim 8 wherein the playback setting comprises one or more equalizer settings.

11. The method of claim 1 further comprising prompting the user to confirm said handover, receiving user input confirming said handover, and sending a confirmation signal from said target playback device to said source playback device to confirm said handover.

12. The method of claim 11 further comprising receiving an acknowledgement signal responsive to said confirmation signal from said source playback device.

13. The method of claim 11 further comprising authenticating said source playback device prior to receiving said playback information.

14. The method of claim 11 further comprising verifying compatibility of said target playback device prior to receiving said playback information.

15. The method of claim 1 wherein detecting a source playback comprises detecting that the source playback device is in range for a data transfer over a near-field communication interface.

16. A method implemented by a source playback device of handing over playback of a media work to a target playback device, said method comprising:
   detecting a target playback device in range for data transfer from said source playback device; and
   transferring, responsive to the detection of the target playback device, playback information from said source playback device to said target playback device while said source playback device is playing said media work to enable said target playback device to continue playback of said media work.

17. The method of claim 16 further comprising prompting the user to confirm playback, receiving user input responsive to said prompting, and sending a confirmation signal between said source and target playback devices to confirm said handover.

18. The method of claim 17 wherein said prompt is displayed to said user on a display associated with said source playback device, and wherein said confirmation signal is sent from said source playback device to said target playback device.

19. The method of claim 17 wherein said prompt is displayed to said user on a display associated with said target playback device, and wherein said confirmation signal is sent from said target playback device to said source playback device.

20. The method of claim 17 further comprising sending an acknowledgement signal between said source and target playback device responsive to said confirmation signal.

21. The method of claim 16 further comprising authenticating said source and target playback devices prior to transferring said playback information.

22. The method of claim 16 further comprising verifying the compatibility of said source and target playback device prior to transferring said playback information.

23. The method of claim 16 further comprising prompting said user to continue playback on said source playback device, receiving user input responsive to said prompting, and continuing/discontinuing playback of said media work by said source playback in accordance with said user input.

24. The method of claim 16 further comprising continuing playback of said media work by said target playback device.

25. The method of claim 16 wherein detecting a target playback comprises detecting that the target playback device is in range for a data transfer over a near-field communication interface.

26. A handover method for transferring playback of a media work from a source playback device to a target playback device, wherein the source and playback devices each include a near-field communication interface, said method comprising: touching the source and playback devices while the source playback device is playing a media work; and transferring, in response to said touching, playback information for said media work from said source playback device to said target playback device to enable said target playback device to continue playback of said media work.

* * * * *